(12) United States Patent
Dave et al.

(10) Patent No.: US 9,310,213 B2
(45) Date of Patent: Apr. 12, 2016

(54) OBTAINING UPDATED NAVIGATION INFORMATION FOR ROAD TRIPS

(71) Applicant: Apple Inc., Cupertino, CA (US)

(72) Inventors: Swapnil R. Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 13/672,354

(22) Filed: Nov. 8, 2012

(65) Prior Publication Data

US 2014/0129143 A1     May 8, 2014

(51) Int. Cl.
*G01C 21/34*     (2006.01)
*G08G 1/0968*    (2006.01)

(52) U.S. Cl.
CPC ........ *G01C 21/3407* (2013.01); *G01C 21/3438* (2013.01); *G08G 1/0968* (2013.01)

(58) Field of Classification Search
CPC .............................. G08G 1/22; G01C 21/3438
USPC .................................................. 701/411, 422
See application file for complete search history.

(56) References Cited

U.S. PATENT DOCUMENTS

| | | | |
|---|---|---|---|
| 6,577,949 B1 * | 6/2003 | Robinson et al. | 701/430 |
| 7,613,563 B2 * | 11/2009 | Haegebarth et al. | 701/117 |
| 8,649,962 B2 * | 2/2014 | Davis et al. | 701/117 |
| 2003/0191584 A1 * | 10/2003 | Robinson et al. | 701/209 |
| 2008/0059007 A1 * | 3/2008 | Whittaker et al. | 701/2 |
| 2008/0065322 A1 * | 3/2008 | Ng et al. | 701/209 |
| 2009/0005018 A1 * | 1/2009 | Forstall et al. | 455/414.1 |
| 2009/0157461 A1 * | 6/2009 | Wright et al. | 705/8 |
| 2009/0276154 A1 * | 11/2009 | Subramanian et al. | 701/213 |
| 2010/0082231 A1 * | 4/2010 | Chang et al. | 701/201 |
| 2011/0118975 A1 * | 5/2011 | Chen | 701/201 |
| 2012/0052870 A1 * | 3/2012 | Habicher | 455/456.1 |
| 2013/0030606 A1 * | 1/2013 | Mudalige et al. | 701/2 |
| 2014/0005941 A1 * | 1/2014 | Paek et al. | 701/533 |

* cited by examiner

*Primary Examiner* — Thomas G Black
*Assistant Examiner* — Peter D Nolan
(74) *Attorney, Agent, or Firm* — Kilpatrick Townsend & Stockton LLP

(57) ABSTRACT

Methods, systems, computer-readable media, and apparatuses for obtaining updated navigation information are presented. A first computing device can receive routing information from a second computing device, where the routing information is indicative of a route determined by the second computing device to a destination. Subsequently, navigation instructions can be provided at the first computing device based upon the routing information received from the second computing device. The first computing device then can receive, from the second computing device, a change to the routing information. Thereafter, and responsive to receiving the change to the routing information, the first computing device can provide modified navigation instructions.

25 Claims, 10 Drawing Sheets

OBTAINING UPDATED NAVIGATION INFORMATION FOR ROAD TRIPS

BACKGROUND OF THE INVENTION

Aspects of the disclosure generally relate to providing geographical navigational information to mobile devices, and more particularly, to providing updated navigational information.

Many people are more frequently using navigation devices in various situations. For example, as smart phones, tablet computers, and other mobile devices increasingly support navigation functionalities, users of these devices may leverage this technology in a number of different circumstances, from walking around town to driving across the country on a road trip.

In the context of a road trip, there may be some instances in which a group of people may split up into different vehicles, even though they are traveling to the same place. For example, if two families are traveling together from San Francisco to San Diego, each family may drive in its own car to reach the common destination of San Diego. Additionally, the drivers of each vehicle may agree upon a particular route in advance of departing on the trip, so that each vehicle can travel along the same route, stop at the same rest stops and restaurants, and otherwise travel in a coordinated manner.

Despite this planning, however, situations may arise once the trip is underway in which the travelers may wish to deviate from the previously planned route. For example, once the travelers and their vehicles leave their respective points of origin and begin driving towards the common destination (e.g., San Diego in the example above), some travelers may wish to stop at a different rest stop earlier or later than others (e.g., to fill up a vehicle with gasoline, to purchase food for a hungry passenger, etc.). In other instances, the route might need to be changed once the trip is underway because of other external circumstances (e.g., to avoid traffic, to circumvent an unexpected road closure, etc.).

When these situations arise after a trip has started, the people driving the various vehicles might need to communicate manually in order to discuss and agree upon the changes in the route. For example, the drivers might need to call each other (e.g., individually using their cell phones) to keep in touch about new waypoints and different route segments to be taken during the road trip. This can be difficult and inconvenient for the travelers, particularly when some people are traveling alone in a vehicle or more than two vehicles are involved in the trip. For instance, if a person is driving alone in a vehicle, he or she might not be able to safely talk on the phone with other travelers about changes in the route. Additionally, if more than two vehicles are involved in the road trip, it might take multiple calls between various travelers to communicate changes in the route to all of the people involved in the trip.

BRIEF SUMMARY OF THE INVENTION

Certain embodiments are described that provide enhanced functionalities and more easy-to-use and convenient ways of sharing navigation information with, among, and/or between mobile computing devices. For example, some embodiments provide ways of creating and sharing a trip with other users and/or devices. The trip may include one or more routes that are shared among the users and/or devices participating in the trip, and each route may describe a particular series of roads, freeways, and/or other paths that can be taken from a common starting point to a particular destination. In addition, by creating and sharing a trip in accordance with these embodiments, the various users and/or devices participating in the trip may coordinate their travel so as to depart, travel, and arrive together, even when traveling in different vehicles or by different means of transportation. Furthermore, some embodiments may allow for dynamic updating of the shared trip and/or its corresponding routes as travel circumstances change on-the-fly, thereby increasing the flexibility and convenience of the user's experience. For instance, waypoints, detours, and changes in destination may be created, detected, and shared in real-time as these situations arise in the course of the trip. In still other embodiments, the role of trip leader may be dynamically reassigned from one user and/or device to another user and/or device as travel circumstances change on-the-fly, and this may further enhance the adaptability provided by various embodiments discussed herein.

According to one embodiment, a first computing device receives routing information from a second computing device, where the routing information is indicative of a route determined by the second computing device to a destination. Subsequently, navigation instructions may be provided at the first computing device based upon the routing information received from the second computing device. The first computing device then may receive, from the second computing device, a change to the routing information. Thereafter, and responsive to receiving the change to the routing information, the first computing device may provide modified navigation instructions.

In other embodiments, a first navigation device may register to follow a shared route having one or more participants, and the one or more participants may include at least one route leader. Subsequently, the first navigation device may provide one or more navigation instructions associated with the route. Thereafter, the first navigation device may receive position information associated with one or more participants. The first navigation device then may determine, based on the position information, whether to update leader status information associated with the route. In some arrangements, this may include determining whether the first navigation device has passed the at least one route leader along the shared route.

A better understanding of the nature and advantages of the present invention may be gained with reference to the following detailed description and the accompanying drawings.

DETAILED DESCRIPTION OF THE INVENTION

A user of a mobile computing device that supports navigation functionalities may wish to share navigation information with one or more other devices and/or users of such devices to coordinate a trip being taken by the user of the mobile computing device and the users of the other devices. In addition to sharing his or her current position, direction of travel, and other related information, the user of the mobile computing device also may wish to share the route that he or she is taking to reach the common destination that is shared by all of the participants in the trip. In particular, as a result of the different algorithms and different user preferences that may be taken into account by different navigation devices, each of the various navigation devices being used by the various participants in the trip may plot slightly different routes to the shared destination. In current and conventional navigation systems, it is typically not possible to synchronize the various navigation devices to follow the same route. Moreover, for a variety of reasons (e.g., the need to stop for food, to use a restroom, to take a picture, etc.), the various participants in the trip may create a number of different detours and waypoints that, with current and conventional systems, would typically need to be manually communicated among the various trip participants.

By implementing various aspects of the disclosure, coordination of the trip may be enhanced and automated. For example, not only can one optimize the route being shared among the various participants in the trip (e.g., by a user and/or device that may be referred to as a "route leader"), but changes to the shared route may be automatically communicated to the participants of the trip, regardless of the reason for which such changes occur. In addition, as a result of these changes, the various navigation devices may provide modified navigation instructions based on the change in route. Furthermore, in situations where one participant in the trip passes another participant that is currently designated as the route leader, some embodiments provide for dynamic reassignment of the route leader status, such that the various participants of the trip may automatically and consistently receive navigation instructions based on the route being taken by the trip participant that is the farthest along the route and/or the closest to the common destination.

Various embodiments will now be discussed in greater detail with reference to the accompanying figures, beginning with FIG. 1.

Example Navigation System and Components

Figure 1:
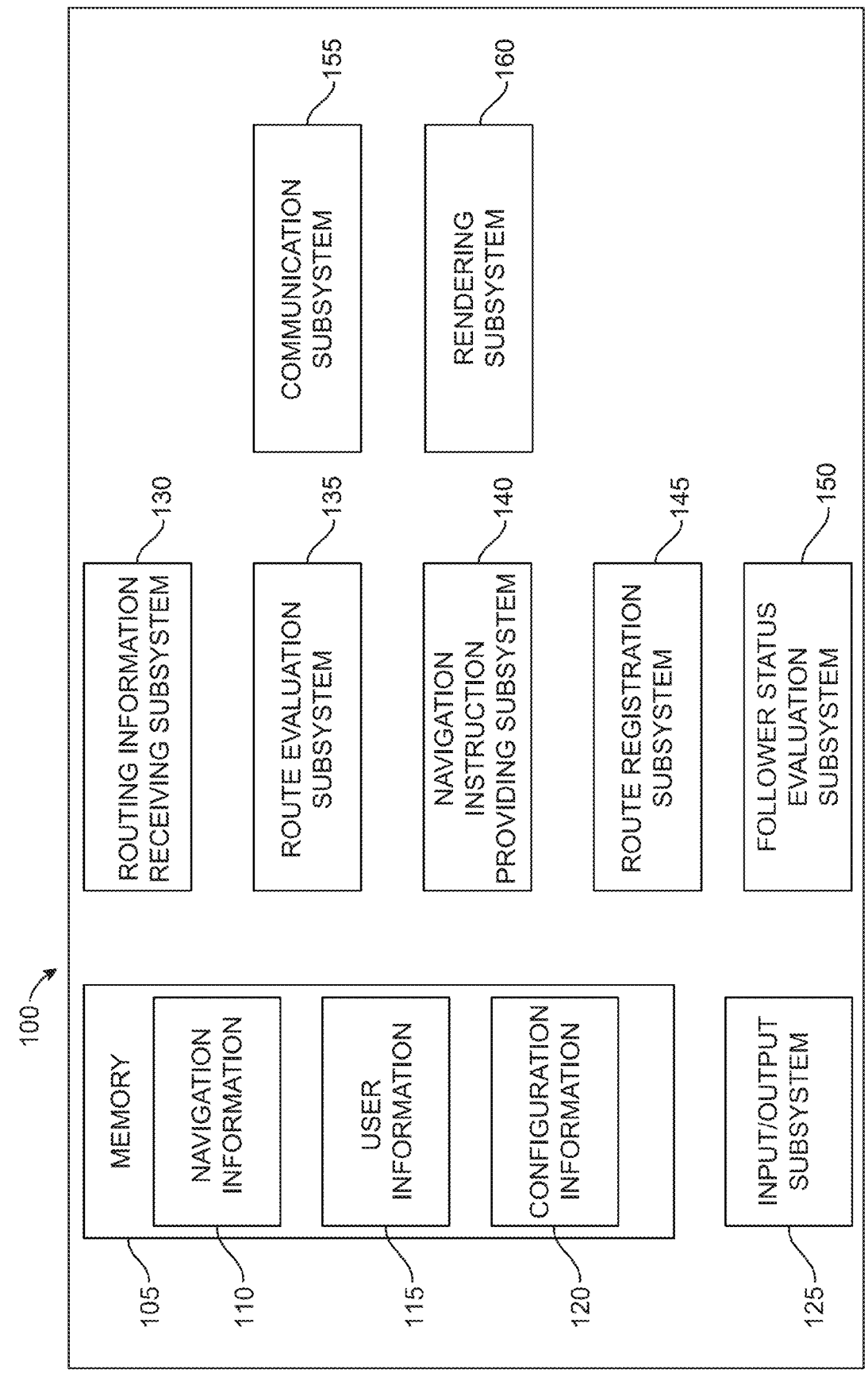
FIG. 1 illustrates a simplified diagram of a system that may incorporate one or more embodiments of the invention.

FIG. 1 illustrates a simplified diagram of a navigation system 100 that may incorporate one or more embodiments of the invention. As seen in FIG. 1, system 100 may include a memory 105 and a number of different subsystems. One or more communication paths may be provided that enable memory 105 and/or the one or more subsystems to communicate with and exchange data with one another. In addition, the various subsystems depicted in FIG. 1 may be implemented in software, in hardware, or in combinations thereof. In some embodiments, the software may be stored on a transitory or non-transitory computer-readable medium and/or be executed by one or more processors.

In some embodiments, system 100 may include other components than those depicted in FIG. 1. Further, the example shown in FIG. 1 is only one example of a system that may incorporate some embodiments of the invention. In some other embodiments, system 100 may have more or fewer components than those shown in FIG. 1, may combine two or more components, or may have a different configuration or arrangement of components. In some embodiments, system 100 may be a part of a mobile device, such as a mobile telephone, a smart phone, a tablet computer, or a multifunction device. In some other embodiments, system 100 may be incorporated into other devices, such as desktop computers, laptop computers, set-top boxes, kiosks, and the like.

In some embodiments, memory 105 may store various types of information, including navigation information 110, user information 115, and configuration information 120. While these types of information are discussed here as examples of the types of information that may be stored in memory 105, in other arrangements, memory 105 may store additional and/or alternative types of information instead of and/or in addition to those shown in FIG. 1 and/or otherwise discussed here.

In some embodiments, navigation information 110 may, for instance, store data that describes one or more maps, one or more routes, and/or other navigation information. The maps included in navigation information 110 may be defined at different degrees of specificity. For example, some maps may be defined at a national or interstate freeway level, while other maps may be defined at a regional or surface street level. As discussed below, navigation information 110 may be used by system 100 and/or one or more other subsystems thereof in calculating and/or otherwise determining a route for traveling from one location to another.

In some embodiments, user information 115 may, for instance, store one or more usernames, one or more passwords, and/or other account-specific information associated with the one or more users of system 100. For example, user information 115 may include information identifying a home location for each of the users of system 100. The home location information may, for example, be used by system 100 in providing navigation instructions to a user of system 100 (e.g., in guiding the user to his or her home). Other information included in user information 115 may, for instance, be used by system 100 to authenticate the user and/or otherwise determine the user's identity.

Configuration information 120 can, for instance, store various user preferences and/or other settings associated with the operations of and/or features provided by system 100. For example, configuration information 120 may store user preferences and/or other settings that affect how system 100 provides navigation instructions to a user thereof. For instance, configuration information 120 may store user preferences and/or other settings specifying that a particular user prefers traveling on freeways to surface streets (or vice versa). As another example, configuration information 120 may store user preferences and/or other settings specifying that a particular user prefers to receive audio navigation instructions from system 100 in a particular language and/or voice.

In some embodiments, information stored in memory 105 may be used by the other subsystems of navigation system 100 in performing various functions and providing various features. For example, as discussed in greater detail below with respect to the various subsystems of system 100, one or more subsystems of system 100 may use navigation information 110, user information 115, and/or configuration information 120 in providing navigation functionalities and/or navigation user interfaces to one or more users of system 100.

Navigation system 100 also may include an input/output subsystem 125, a routing information receiving subsystem 130, a route evaluation subsystem 135, a navigation instruction providing subsystem 140, a route registration subsystem 145, a follower status evaluation subsystem 150, a communication subsystem 155, and/or a rendering subsystem 160. Each of these subsystems of system 100 will now be described, in turn, in greater detail.

In some embodiments, input/output ("I/O") subsystem 125 may provide an interface that allows a user to interact with system 100. For instance, I/O subsystem 125 may enable system 100 to output information to the user. For example, I/O subsystem 125 may include a display device, such as a monitor or a screen. Additionally or alternatively, I/O subsystem 125 may include one or more input devices that allow a user to provide input to system 100. The input devices may include, without limitation, a mouse, a pointer, a keyboard, or other input devices. In some embodiments, I/O subsystem 125 may include a touch-sensitive interface, such as a touch-sensitive display screen (also sometimes referred to as a touch screen), that can both display information to a user and also receive input from the user. For example, I/O subsystem 125 may display one or more of the example user interfaces discussed below, and further may receive one or more user selections of various controls included in such user interfaces.

In some embodiments, routing information receiving subsystem 130 may enable system 100 to receive routing information from another device, such as another navigation system. Such routing information may, for instance, describe one or more routes from a particular origin to a particular destination. In some instances, the routing information also may describe and/or identify a particular route from the origin to the destination that will be or is being taken by the other device (or the user thereof). Using such routing information, system 100 may, for instance, be able to provide navigation instructions to a user of system 100 that direct the user to take the same route that will be or is being taken by the other device. Additionally or alternatively, using such routing information, system 100 may, for instance, be able to provide other navigation instructions to the user that direct the user to take a different route than the route that will be or is being taken by the other device (e.g., in instances in which the route that will be or is being taken by the other device might not be desirable for some reason, such as heavy traffic, bad weather, etc.).

In some embodiments, route evaluation subsystem 135 may enable system 100 to evaluate and/or otherwise analyze a route from an origin to a destination. For example, route evaluation subsystem 135 may be configured to cause route evaluation subsystem 135 to determine a route from an origin to a destination, compare two or more potential routes from an origin to a destination, and/or identify an optimal route from an origin to a destination.

In some instances, route evaluation subsystem 135 may, for example, determine a route from an origin to a destination by identifying one or more steps from a current location of system 100 (or another defined start location) to the particular destination. Such a determination may, for instance, be based on navigation information 110 included in memory 105 of system 100. Additionally, route evaluation subsystem 135 may, for instance, compare two or more potential routes from an origin to a destination by comparing the predicted arrival times, trip durations, and/or other properties of the various routes. In some instances, route evaluation subsystem 135 may, for example, use navigation information 110 included in memory 105 of system 100 in comparing the two routes. Such navigation information 110 may provide the distance traveled in each step of the routes, the estimated speed at which such distance is traveled, and/or other information that may be used by system 100 in performing this analysis. In addition, route evaluation subsystem 135 may, for example, identify an optimal route from an origin to a destination based on the comparison of the two or more routes evaluated by route evaluation subsystem 135. Here again, route evaluation subsystem 135 may, for instance, use navigation information 110 included in memory 105 of system 100, as well as user information 115 and/or configuration information 120, in comparing the two routes. For example, route evaluation subsystem 135 may determine that one route is more optimal than one or more other routes, based on the estimated times of arrival at the destination for each of the various routes being evaluated, and further based on the route satisfying other criteria that may be defined in user preferences and/or other settings, such as settings that specify preferences regarding traveling on freeways instead of surface streets, avoiding toll roads, and/or the like.

In some embodiments, navigation instruction providing subsystem 140 may enable system 100 to provide one or more navigation instructions, for example, to a user of system 100. In some instances, the navigation instructions provided by navigation instruction providing subsystem 140 may, for example, be based on navigation information 110, as well as route information obtained from routing information receiving subsystem 130 and/or route evaluation subsystem 135. In other words, navigation instruction providing subsystem 140 may provide navigation instructions from a current location to a destination based on routing information received from another user and/or another device, as well as based on routing information that is determined by system 100 itself.

In some embodiments, navigation instruction providing subsystem 140 may be configured to determine, in providing navigation instructions to a destination, a current location of system 100. In addition, navigation instruction providing subsystem 140 may further be configured to subsequently determine, based on applicable routing information, a current step and/or a next step of a route to be provided, for example, to a user. In some instances, such navigation instructions may be provided to a user via a graphical user interface (e.g., as may be displayed and/or otherwise provided using input/output subsystem 125 and/or rendering subsystem 160). Additionally or alternatively, such navigation instructions may be provided via an audio interface (e.g., using computerized text-to-speech functionality that may be provided by input/output subsystem 125).

In some embodiments, route registration subsystem 145 may enable system 100 and/or a user of system 100 to register as a leader of a new trip (e.g., a trip that includes one or more routes, one or more destinations, etc.) and/or as a follower of such a trip or such routes. For example, route registration subsystem 145 may be configured to generate and/or draw one or more user interfaces that allow a user of system 100 to view a listing of one or more trips and/or one or more routes, which may have been created by other users of other devices and with respect to which the user can register as a follower. Route registration subsystem 145 may be further configured to register system 100 as a follower of a particular trip or route, based on a user selection of the particular trip or route in a graphical user interface, for instance, by communicating with one or more remote servers that coordinate the sharing of navigation information. Additionally or alternatively, route registration subsystem 145 may be configured to generate and/or draw one or more user interfaces that allow a user of system 100 to define a new trip and/or route to which other users and/or other devices can register as followers. In addition, route registration subsystem 145 may be further configured to register the newly created trip and/or route by communicating with the one or more remote servers that coordinate the sharing of navigation information.

Follower status evaluation subsystem 150 can, in some embodiments, enable system 100 to determine and/or update follower and leader information that is associated with a particular trip and/or a particular route. Such follower and leader information may, for instance, indicate whether a particular person and/or a particular device is a follower or a leader of a particular trip and/or a particular route. For example, follower status evaluation subsystem 150 may be configured to determine whether a user of system 100 is currently registered as a follower or as a leader of a particular trip or route. In addition, follower status evaluation subsystem 150 may be configured to determine, based on current position information describing the current position of system 100 and/or the current position(s) of other users and/or devices associated with the particular trip or route, whether such follower and leader information should be updated (e.g., based on changes in the relative positions of the various users and/or devices involved in the particular trip or route).

For instance, in an example in which the user of system 100 is registered as the leader of a particular trip or route, follower status evaluation subsystem 150 may be configured to determine whether one or more followers have overtaken the user of system 100, as this may indicate that the user of system 100 should no longer be listed as the leader of the particular trip or route. In addition, follower status evaluation subsystem 150 may be configured to update the registered follower and leader information for the particular trip or route, which may, for instance, be stored on a remote server used for coordinating the trip or route. Such information may, for example, be updated to indicate that the user of system 100 is now a follower of the trip or route, and another user is now the leader of the trip or route.

In another example in which the user of system 100 is registered as a follower of a particular trip or route, follower status evaluation subsystem 150 may be configured to determine whether the user of system 100 has overtaken the leader of the particular trip or route. In addition, follower status evaluation subsystem 150 may be configured to update the registered follower and leader information for the particular trip or route in accordance with this determination. For instance, follower status evaluation subsystem 150 may update the registered follower and leader information for the particular trip or route to indicate that the user of system 100 is now the leader of the trip or route.

In some embodiments, communication subsystem 155 may enable system 100 to electronically communicate with one or more other networks and/or devices. For example, communication subsystem 155 may include one or more wired communication interfaces (e.g., one or more Ethernet interfaces, one or more serial communication interfaces, etc.) and/or one or more wireless communication interfaces (e.g., one or more WiFi interfaces, such as one or more IEEE 802.11a/b/g/n interfaces; one or more cellular interfaces; one or more Bluetooth interfaces; etc.) via which system 100 and/or the various subsystems included therein may communicate and/or otherwise exchange information with one or more other computing devices. For instance, by using communication subsystem 155, routing information receiving subsystem 130 may receive routing information from another device, such as another navigation system. Similarly, by using communication subsystem 155, route registration subsystem 145 may be able to communicate with one or more remote servers that coordinate the sharing of navigation information.

In some embodiments, rendering subsystem 160 may enable system 100 to render and/or otherwise display one or more user interfaces, including one or more user interfaces and/or user interface elements that may be generated and/or otherwise drawn by one or more other subsystems included in system 100. For example, rendering subsystem 160 may include one or more graphics processors and/or rendering engines, which may be configured to receive information from the other subsystems included in system 100 about user interfaces and/or user interface elements to be rendered and/or otherwise displayed. In addition, rendering subsystem 160 may be configured to cause one or more user interfaces and/or user interface elements to be displayed once such user interfaces and/or user interface elements are rendered. For instance, by using rendering subsystem 160, system 100 may be able to render, and/or cause to be displayed, one or more user interfaces generated by route registration subsystem 145, which may allow a user of system 100 to register as a follower of a particular trip or route and/or may allow the user to create a new trip or route to which other people and/or devices may subscribe as followers. Additionally, in some embodiments, rendering subsystem 160 may enable system 100 to render the example user interfaces that are discussed below and illustrated in FIGS. 2-5 and in FIG. 7.

Sharing Navigation Information and Providing Navigation Instructions

As noted above, system 100 and its various subsystems may generate, draw, render, and/or otherwise provide various user interfaces to a user of the system, and these user interfaces may enable the user to utilize a number of different functionalities and features that can be provided by system 100. For example, by interacting with various user interfaces provided by system 100, a user of system 100 may be able to create a trip or route, share the trip or route with one or more other users and/or devices, register to follow and/or otherwise subscribe to a trip or route created by another user and/or device, and receive navigation instructions associated with a particular trip or route. While these functionalities are listed here as examples of the types of features that may be provided by system 100 via one or more user interfaces, other functionalities may additionally or alternatively be provided via such user interfaces in additional and/or alternative embodiments. Several examples of the user interfaces that may be provided by system 100 will now be described in greater detail, beginning with FIG. 2.

Figure 2:
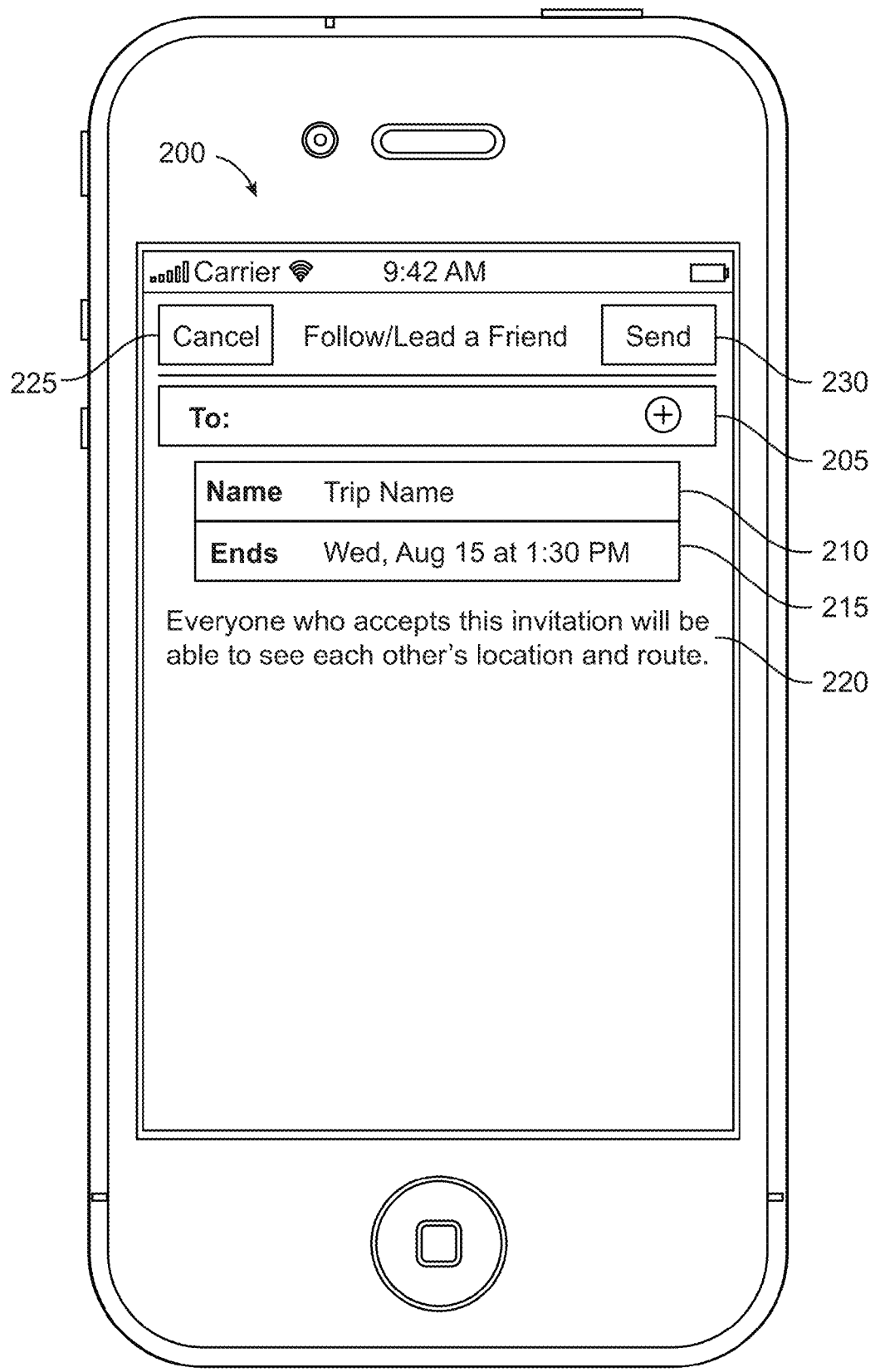
FIG. 2 illustrates an example user interface for creating a trip according to some embodiments.

FIG. 2 illustrates an example user interface 200 for creating a trip according to some embodiments. As seen in FIG. 2, user interface 200 may include one or more controls and/or other regions that may display information to and/or receive input from a user of system 100. In particular, the various controls and/or other regions included in user interface 200 may allow the user to define an invitation that may be sent to other users and/or devices. Such an invitation may, for instance, enable these other users and/or devices to register as followers of, and/or otherwise subscribe to, the trip or route being created by the user of system 100.

For example, user interface 200 may include a recipient field 205 in which a user of system 100 may be able to select and/or otherwise specify one or more intended recipients of the trip invitation being defined by the user via user interface 200. In populating recipient field 205, for instance, the user of system 100 may be prompted to select one or more recipients for the trip invitation from a contact list that includes names, addresses, phone numbers, email addresses, and/or other information associated with the user's one or more contacts.

In addition, user interface 200 may include a name field 210 in which a user may be able to specify a trip name for the trip being created via user interface 200. In some instances, such a trip name may, for example, be displayed to the one or more recipients of the trip invitation when these recipient(s) receive the invitation being created. In other instances, the trip name may be displayed in a directory or listing of trips to which various users and/or devices may subscribe as followers.

In some embodiments, user interface 200 also may include a date field 215 in which a user may be able to specify a date and/or time at which the trip is scheduled to conclude. Such a date and/or time may, for instance, define a point in time after which the user's location information will no longer be shared with other users and/or devices that may be following the user along the trip and/or route. One or more warnings 220 also may be included in user interface 200 so as to address potential privacy concerns associated with sharing location information.

In addition to these regions and fields, user interface 200 also may include a cancel button 225 and a send button 230. Cancel button 225 may, for instance, allow a user to close the invitation being created on user interface 200 without sending the invitation to any of the selected and/or specified recipients. Additionally, send button 230 may, for instance, enable the user to issue a command causing the trip invitation being defined on user interface 200 to be sent to the one or more recipients specified in recipient field 205.

When a user receives and/or accepts a trip invitation created by another user, such as the trip invitation defined in user interface 200, the recipient user may begin receiving navigation instructions for traveling along the one or more routes that are associated with the trip. For example, the trip may include a route from San Francisco, Calif., to San Diego, Calif., that involves traveling along a particular series of roads and/or freeways. While other routes also may be taken between these two cities, for instance, along different roads and/or freeways, the particular route that is sent by the creator of the trip may define the route with respect to which corresponding navigation instructions are provided for the user(s) following the route. An example of a user interface that may be used in providing navigation instructions to such a user will now be described in greater detail with respect to FIG. 3.

Figure 3:
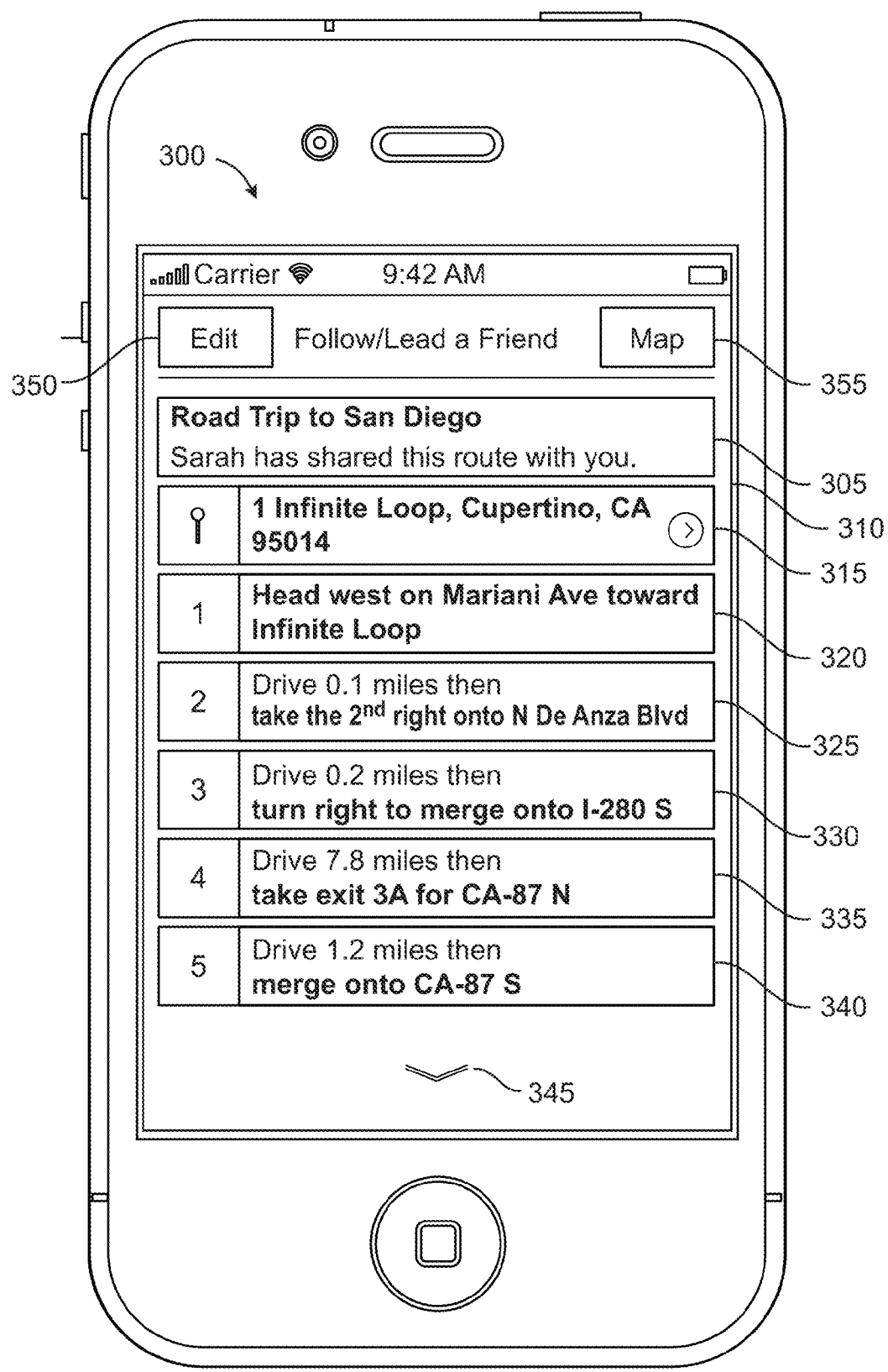
FIG. 3 illustrates an example user interface for displaying a route associated with a trip according to some embodiments.

FIG. 3 illustrates an example user interface 300 for displaying a route associated with a trip according to some embodiments. In particular, as seen in FIG. 3, a route may include a series of steps from one location (e.g., the current location of the device providing user interface 300) to a destination location. As noted above, routes may be shared between different users and/or devices, so as to allow the various users and/or devices to take the same, and ideally optimized, path from a similar starting location to the destination location. While in some instances, the different users and/or devices that are sharing the route may have different starting locations, the particular route that is provided to each of the individual users who are sharing the route may include a first set of instructions which directs the individual user to a point at which they can join the route that is shared among all of the users and/or devices, as well as a second set of instructions which is shared among all of the users and/or devices that are following the shared route.

In some embodiments, user interface 300 may include a status region 305 in which status text associated with the shared route is displayed. For example, as seen in FIG. 3, status region 305 may identify the user and/or device that created the shared route. In other instances, status region 305 may identify the user and/or device that is currently leading one or more other users and/or devices along the route. Status region 305 may also identify one or more other users and/or devices that are currently traveling along the route.

In some embodiments, user interface 300 may further include a route display region 310 in which one or more steps associated with the shared route may be displayed. Each of the one or more steps (e.g., step 315, step 320, step 325, step 330, step 335, and step 340) may, for instance, be a navigation instruction provided to a user of system 100 via user interface 300. In addition, each of the one or more steps displayed in route display region 310 may be user-selectable, and additional information about a particular step may be displayed based on receiving a selection of the particular step via the user interface.

In addition, user interface 300 may include a number of user-selectable buttons, including a scroll button 345, an edit button 350, and a map button 355. Each of the one or more buttons may, for instance, enable the user to access and/or control various functions. For example, scroll button 345 may enable a user to scroll through the listing of navigation instructions that may be included in route display region 310. Additionally, edit button 350 may, for instance, enable the user to edit the listing of navigation instructions included in route display region 310 and/or otherwise modify the route. Furthermore, map button 355 may enable the user to view a map in which the current location of the user and/or the device providing user interface 300 may be visually illustrated and/or in which other locations may be visually illustrated (e.g., locations associated with the various steps of the route, the destination, etc.).

As noted above, if a user selects a particular step displayed in route display region 310, additional information about that step may be displayed in greater detail. An example of a user interface that may be used in providing additional information about a step in a route will now be described with respect to FIG. 4.

Figure 4:
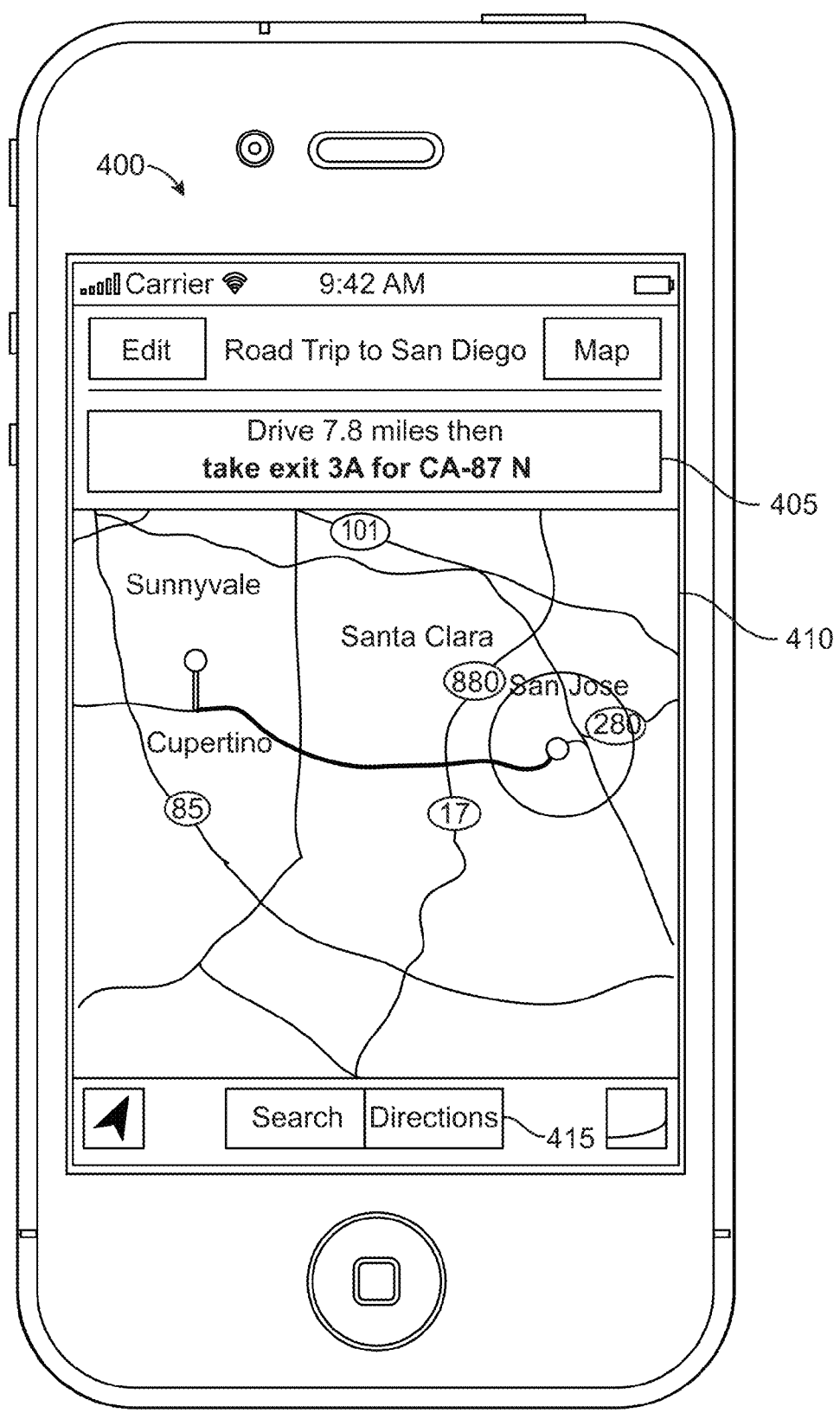
FIG. 4 illustrates an example user interface for providing navigation instructions according to some embodiments.

FIG. 4 illustrates an example user interface 400 for providing navigation instructions according to some embodiments. As seen in FIG. 4, after a user selects a particular step of a route to be viewed in more detail, additional information about that step may be displayed. Such additional information may, for instance, include a map that visually illustrates the segment of the route corresponding to the step.

For example, user interface 400 may include a status region 405 in which a text description of the particular step of the route may be displayed. In addition, user interface 400 may include a map region 410 in which a map may be displayed. Such a map may, for instance, visually illustrate the particular step of the route in greater detail. Furthermore, user interface 400 may include a directions button 415, which may allow a user to return to a user interface in which, for instance, the various steps of the route are displayed in list form, as in example user interface 300 of FIG. 3.

Handling Changes to a Shared Route

In some instances in which a user of system 100 is following another person or device along a particular route, the leader of that route might change the route. Such a change may, for instance, include a change in destination, the addition or deletion of a waypoint, or simply a change in the roads, freeways, and/or other segments that make up the route. In some embodiments, when such a change in route occurs, a notification may be provided to a user who is following the route, so as to enable such a following user to follow the leader along the new route.

Figure 5:
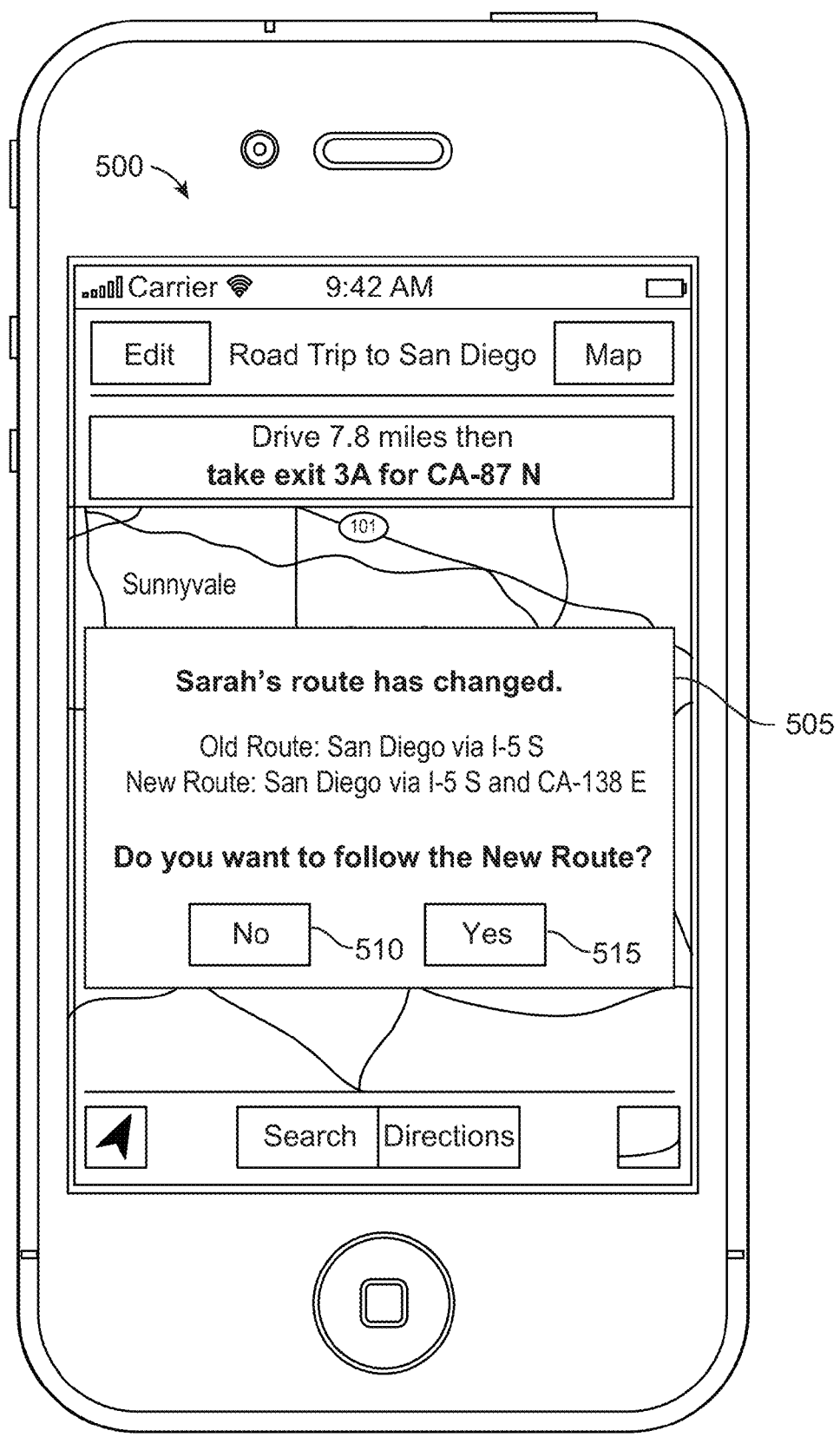
FIG. 5 illustrates an example user interface for providing a notification of a change in route according to some embodiments.

FIG. 5 illustrates an example user interface 500 for providing a notification of a change in route according to some embodiments. As noted above, there may be situations in which a route that is associated with a shared trip may change. For example, in some embodiments, such a change in route may be determined by a user device (e.g., system 100) used by a user who is following a leader along the route, based on a notification message received from the leader that the route has been changed. In other embodiments, a change in route may be detected automatically by the user device, for instance, based on position information and/or other navigation information describing the current position and/or direction of travel of the leader of the route.

For example, system 100 may determine that a shared route being followed has changed, based on detecting that position information associated with the leader of the route indicates that the leader has stopped at a gas station, restaurant, hotel, rest stop, scenic view point, or other place, and accordingly, that the route now includes a waypoint corresponding to this stop. Other reasons may result in a change in a shared route in other instances. For example, a route may change because a leading user decides to take a different road, freeway, or other path to get out of or avoid a traffic jam.

As discussed above, a change in route may, in some embodiments, be detected by a user device (e.g., system 100) based on navigation information received from another user device. In other embodiments, a user device (e.g., system 100) may determine a change in route based on information received from a server that coordinates sharing of the route. For instance, a user device may determine, based on navigation information received from a server, that a leading user is no longer traveling along the shared route. In still other embodiments, a server which coordinates sharing of the route may determine that the route has changed (e.g., based on analysis performed by the server of the leading user's position information). In these embodiments, the server may notify the one or more user devices following the route of the change in route.

In one or more embodiments, when a change in route occurs, a user device, such as system 100, may display a notification similar to the one illustrated in FIG. 5. In particular, as seen in FIG. 5, user interface 500 may include a notification 505 that is configured to inform a user of system 100 of a change in route. For example, notification 505 may be configured to inform the user that the leading user has modified the shared route (e.g., by taking a road, freeway, path, or other segment different from and/or otherwise not included in the original route). As seen in FIG. 5, the notification may also include information describing the old route, as well as information describing the new route, so as to enable a user of system 100 to decide whether to follow the new route or continue following the old route.

In addition, the notification (e.g., notification 505) may be configured to prompt the user to select whether to follow the new route instead of the old route. If the user of system 100 selects to follow the new route (e.g., by selecting yes button 515), then the user device (e.g., system 100) may recalculate and/or otherwise update the directions and/or other navigation instructions being provided to reflect the new route. On the other hand, if the user of system 100 selects not to follow the new route (e.g., by selecting no button 510), then the user device (e.g., system 100) may continue to provide directions and/or other navigation instructions associated with the original route.

Figure 6:
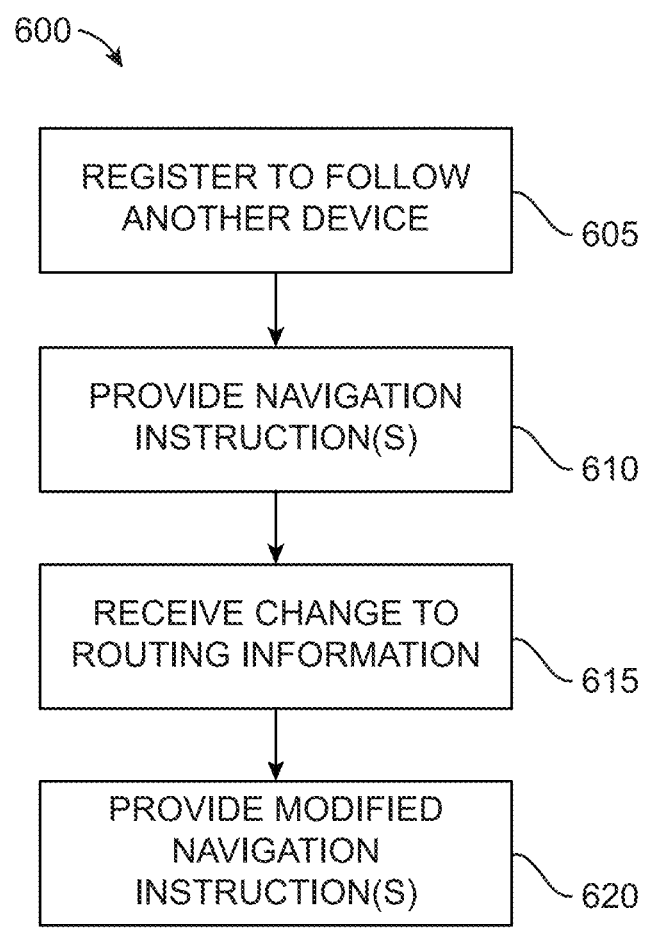
FIG. 6 illustrates a simplified flowchart depicting a method of obtaining updated navigation information according to some embodiments.

FIG. 6 illustrates a simplified flowchart 600 depicting a method of obtaining updated navigation information according to some embodiments. Using the method illustrated in FIG. 6, a computing device, such as system 100, may be able to detect and handle the occurrence of a change in a shared route. For example, based on determining that a change in route has occurred, the computing device may be able to provide modified navigation instructions in view of the change in route.

In step 605, in which a user device may register to follow another device for a particular trip or along a particular route. For example, a user device (e.g., system 100) may send one or more registration messages to the other device to be followed and/or to a coordinating server. The one or more registration messages may, for instance, form a request to follow the other device for a particular trip and/or along a particular route. In some embodiments, the user device (e.g., system 100) may register to follow the other device in this manner based on receiving user input that corresponds to a user request to follow the other device (e.g., on a particular trip or route on which the other device may travel). For example, the user of the user device may provide such input by accepting an invitation to follow the other user along a route, or the user of the user device may have selected to follow the route from a list of available trips and/or routes displayed on and/or otherwise provided via the user device.

In step 610, the user device may provide one or more navigation instructions. Such navigation instructions may, for instance, be based on the route along which the user device is following the other device. In addition, the navigation instructions may include initial instructions that guide the user and/or the user device to a starting point after which the route coincides with the route being taken by the leading user. In particular, after the initial instructions to the starting point, the navigation instructions may include subsequent instructions that guide the user and/or the user device along the shared route (e.g., the route being taken by the leading user and other followers of the route).

In step 615, the user device (e.g., system 100) may receive a change in the routing information. In some embodiments, receiving a change in the routing information may include receiving a notification, from the route leader's device and/or from a server coordinating sharing of the route, indicating that the route has changed. Such a notification may, for instance, be received by routing information receiving subsystem 130. Additionally or alternatively, receiving a change in the routing information may include receiving navigation information that describes the position and/or direction of the route leader's device, and subsequently determining, based on the received navigation information, that the route has changed. Such a determination may, for instance, be made by route evaluation subsystem 135 of system 100, based on information describing the current position and/or direction of the route leader's device.

To obtain the change in routing information, the user device can determine that the current position of the route leader's device is not along the route, and send a request to the route leader's device to provide updated routing information. For example, the user device (e.g., system 100) may, in some instances, evaluate and/or otherwise analyze navigation information received from the route leader's device to determine whether the route leader's device is still traveling along the originally shared route. If the user device (e.g., system 100) determines that the route leader's device is no longer traveling along the originally shared route, the user device may request the route leader's device to provide updating routing information, so that the user device can continue to provide coordinated and consistent navigation instructions to the user of the user device. This may include obtaining updated information about one or more detours, waypoints, and/or other changes that may have manually been made to the route by the route leader, as well as obtaining updated information about route changes that may have been introduced simply as a result of a change in course or other actions taken by the route leader (e.g., while driving and/or otherwise traveling, and without manually reprogramming the route being used by the route leader's navigation device).

Additionally, in some embodiments, receiving a change in the routing information may include receiving data that describes current traffic conditions. Such data may, for instance, describe current traffic conditions along the route that are being experienced and/or observed by one or more other trip participants, including the route leader. In addition to receiving routing information that includes data describing the current traffic conditions, the user device (e.g., system 100) also may calculate and/or otherwise determine a detour or new waypoint to avoid or wait out upcoming traffic that may, for instance, be indicated by the received data.

In step 620, the user device (e.g., system 100) may provide modified navigation instructions based on the change in the routing information. For example, in step 620, system 100 may provide modified navigation instructions that direct the user of the user device to the new or changed route, and subsequently, direct the user along the changed route.

Swapping Follower and Leader Status for a Shared Route

In some instances, a user and/or user device that is following a route leader along a particular route may pass the route leader. For instance, a route follower may wind up in front of and/or otherwise ahead of the route leader along a particular route. To handle such an occurrence, some embodiments provide ways of dynamically adjusting the user and/or device that is designated as the route leader as the various users and devices are traveling along the particular route. In particular, in some embodiments, the one or more user devices and/or coordination servers that are used in implementing various aspects of the disclosure may be configured to allow a route follower which passes a route leader to become the new route leader for the route. In these embodiments, a user interface similar to the one illustrated in FIG. 7 may be displayed by a user device to facilitate changing the identity of the route leader.

Figure 7:
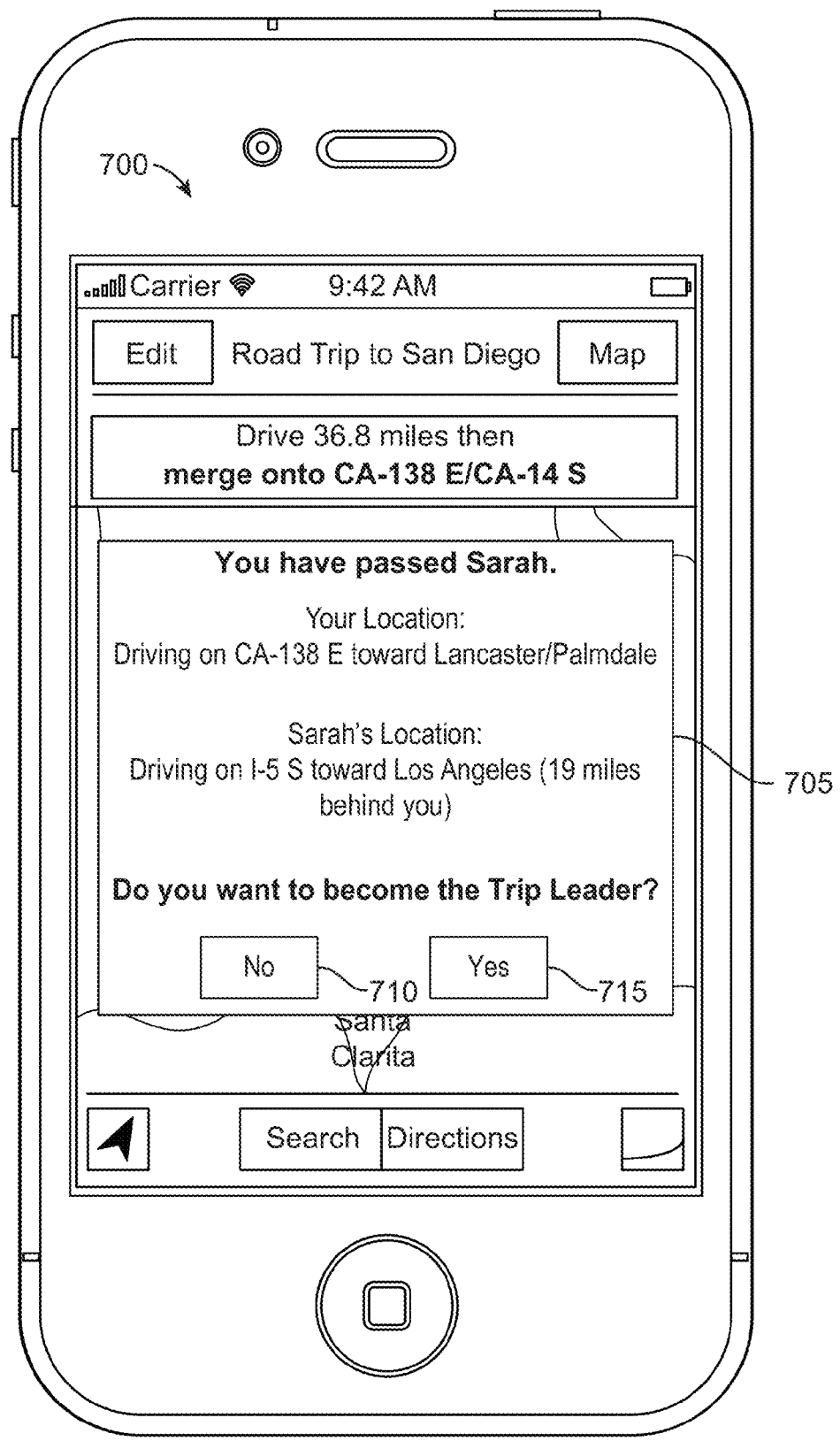
FIG. 7 illustrates an example user interface for swapping follower and leader status according to some embodiments.

FIG. 7 illustrates an example user interface 700 for swapping follower and leader status according to some embodiments. As seen in FIG. 7, when a user device that is following another device along a particular route passes the leader device for the route, a notification similar to notification 705 of user interface 700 may be displayed to inform the user of this occurrence. The notification may, for instance, be configured to indicate the current location of the passing user (e.g., the current location of the device displaying the notification), as well as the current location of the route leader (e.g., the current location of the route leader's device that has been passed). A similar notification may, for instance, be displayed on and/or by the route leader's device.

In addition, notification 705 may be configured to prompt a user to indicate whether they wish to become the trip leader for the shared route being followed. For example, if the passing user of the user device (e.g., system 100) indicates that they wish to become the trip leader for the shared route (e.g., by selecting yes button 715), then the user device may update leader and follower status information to reflect the change in the leader status. This updating may, for instance, include providing updated status information to a server coordinating sharing of the route and/or to one or more other user devices that may now follow the passing user and their user device along the route. On the other hand, if the passing user of the user device indicates that they do not wish to become the trip leader for the shared route (e.g., by selecting no button 710), then the user device may continue to provide directions and/or other navigation instructions associated with the original route, without modifying the leader and follower status information.

Figure 8:
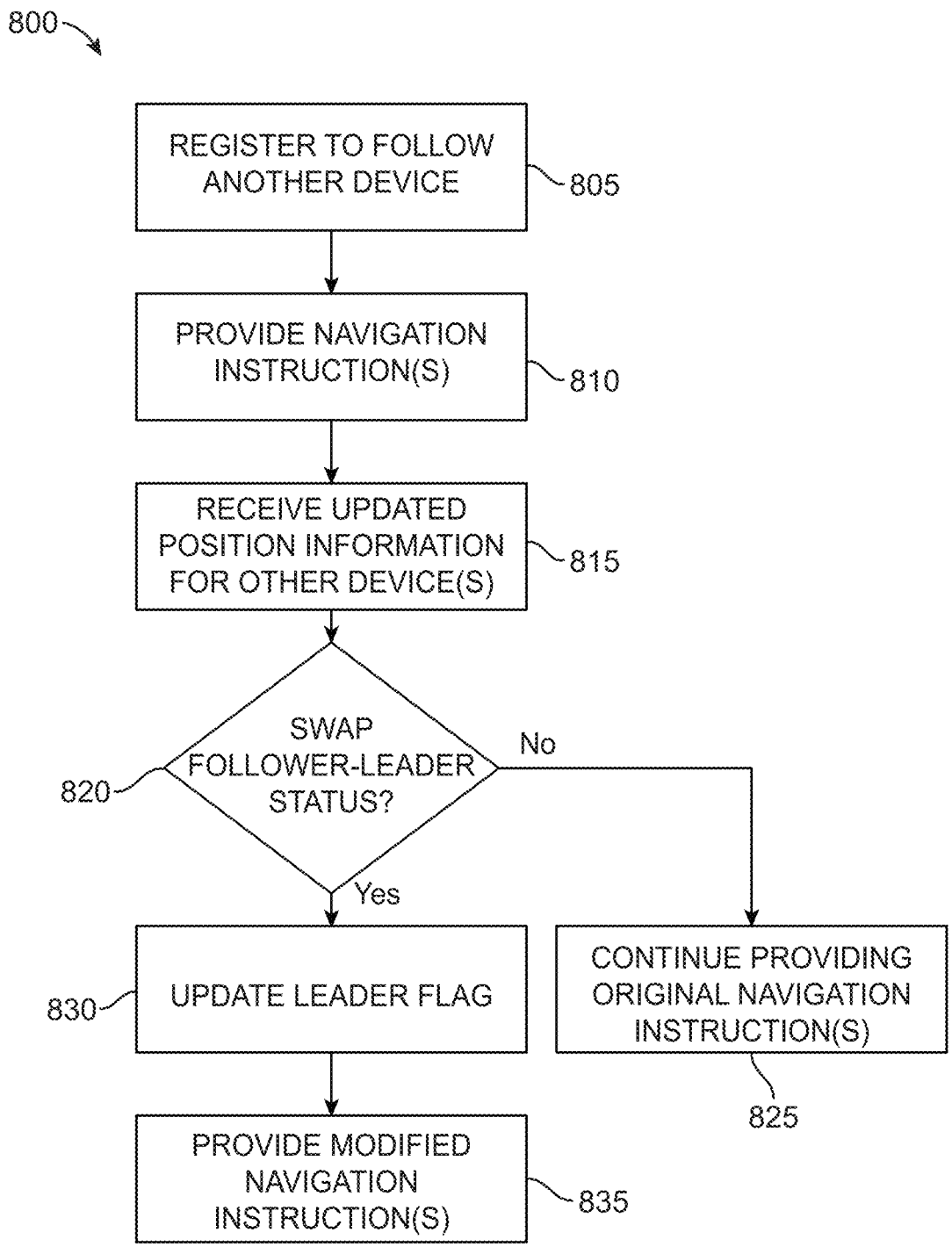
FIG. 8 illustrates a simplified flowchart depicting a method of swapping follower and leader status according to some embodiments.

FIG. 8 illustrates a simplified flowchart 800 depicting a method of swapping follower and leader status according to some embodiments. In particular, the method illustrated in FIG. 8 can be performed by a user device (e.g., system 100) when, while traveling along a shared route, the user device passes the route leader for the shared route.

In step 805, in which a user device may register to follow another device for a particular trip or along a particular route. For example, in step 805, a user device (e.g., system 100) may register to follow another device (which may referred to as a "route leader," and/or which may be used by a user that is referred to as the "route leader") similar to how such registration may occur in step 605 of the example method illustrated in FIG. 6 and as discussed above.

In step 810, the user device may provide one or more navigation instructions. For example, in step 810, the user device (e.g., system 100) may provide one or more navigation instructions similar to how such navigation instructions may be provided in step 610 of the example method illustrated in FIG. 8 and as discussed above.

In step 815, the user device (e.g., system 100) may receive updated position information from one or more other devices associated with the trip or route (e.g., from the route leader, from the one or more other devices that may be following the route, etc.). Such position information may include the current location of each of the other devices (e.g., in geographic coordinates), the current direction of travel for each of the other devices, the current speed of each of the other devices, and/or other information about each of the other devices associated with the trip or route.

In step 820, the user device (e.g., system 100) may determine whether to swap and/or otherwise modify the leader and follower status information associated with the trip or route. In some embodiments, determining whether to swap and/or otherwise modify the leader and follower status information associated with the trip or route may include analyzing the position information for the other devices associated with the trip or route; determining, based on such position information, whether the user device has passed the route leader; displaying and/or otherwise providing a notification to a user of the user device that indicates that the route leader has been passed; and/or prompting the user of the user device to provide input specifying whether the leader and follower status information should be modified as a result of the route leader being passed (e.g., by displaying the example user interface illustrated in FIG. 7 and discussed above). In other embodiments, rather than prompting the user of the user device to provide input specifying whether the leader and follower status information should be modified as a result of the route leader being passed, the user device may automatically determine that the leader and follower status information should be modified based on determining that the route leader has been passed.

In still other embodiments, determining whether to swap and/or otherwise modify the leader and follower status information associated with the trip or route may include receiving coordination information from one or more servers coordinating the sharing of the route, where such coordination information indicates that the user device has passed the route leader. Subsequently, the user device may prompt the user of the user device to provide input specifying whether the leader and follower status information should be modified as a result of the route leader being passed, or may automatically determine that such information should be modified, as in the examples discussed above.

If it is determined, in step 820, that the leader and follower status information should not be modified as a result of the route leader being passed, then in step 825, the user device may continue providing navigation instructions in accordance with the original routing information. For example, in step 820, the user device may continue providing navigation instructions without modifying the route, the navigation instructions, or the leader and follower status information. The original route leader may, for instance, continue to be considered the route leader and/or may send route changes to the one or more other devices that may be following the particular trip or route. Subsequently, the method may end, or alternatively, the method may repeat in a loop, with the user device continuing to receive and/or evaluate updated position information for the one or more other devices associated with the trip or route.

If, on the other hand, it is determined, in step 820, that the leader and follower status information should be modified as a result of the route leader being passed, then in step 830, the user device may update a leader flag associated with the trip or route. In some embodiments, updating a leader flag associated with the trip or route may include sending leader status information (e.g., in the form of one or more data messages) to the one or more other users and/or user devices that are associated with the trip or route (e.g., the route leader, the one or more other devices that are following the route, etc.). Such leader status information may, for instance, include information identifying the user device (e.g., system 100) as the new route leader, as well as other information associated with the user device, such as a network address assigned to the user device, other network information associated with the user device, current position information for the user device, and/or other information. Additionally or alternatively, updating a leader flag associated with the trip or route may include sending leader status information to one or more servers that may coordinate sharing of the trip or route. In some embodiments, the one or more servers may subsequently provide the leader status information to the other user devices associated with the route or trip, instead of or in addition to the user device that is updating the leader flag.

In step 835, the user device (e.g., system 100) may provide modified navigation instructions in view of the change in the leader flag. For example, in step 835, the user device may modify the shared route (e.g., based on navigation preferences and/or other settings unique to the user device, which has now assumed the role of being the route leader) and may subsequently provide navigation instructions in accordance with the modified route. In addition, if the user device modifies the shared route in this manner, the user device also may update the one or more other devices associated with the trip or route, so as to cause such other devices to follow the newly modified route (e.g., as modified by the user device, which is now the route leader).

Example Distributed System

In some configurations, a distributed model may be used to provide one or more of the features discussed herein. For example, in some embodiments, system 100 may be configured as a distributed system in which one or more components of system 100 are distributed and coupled via one or more networks.

Figure 9:
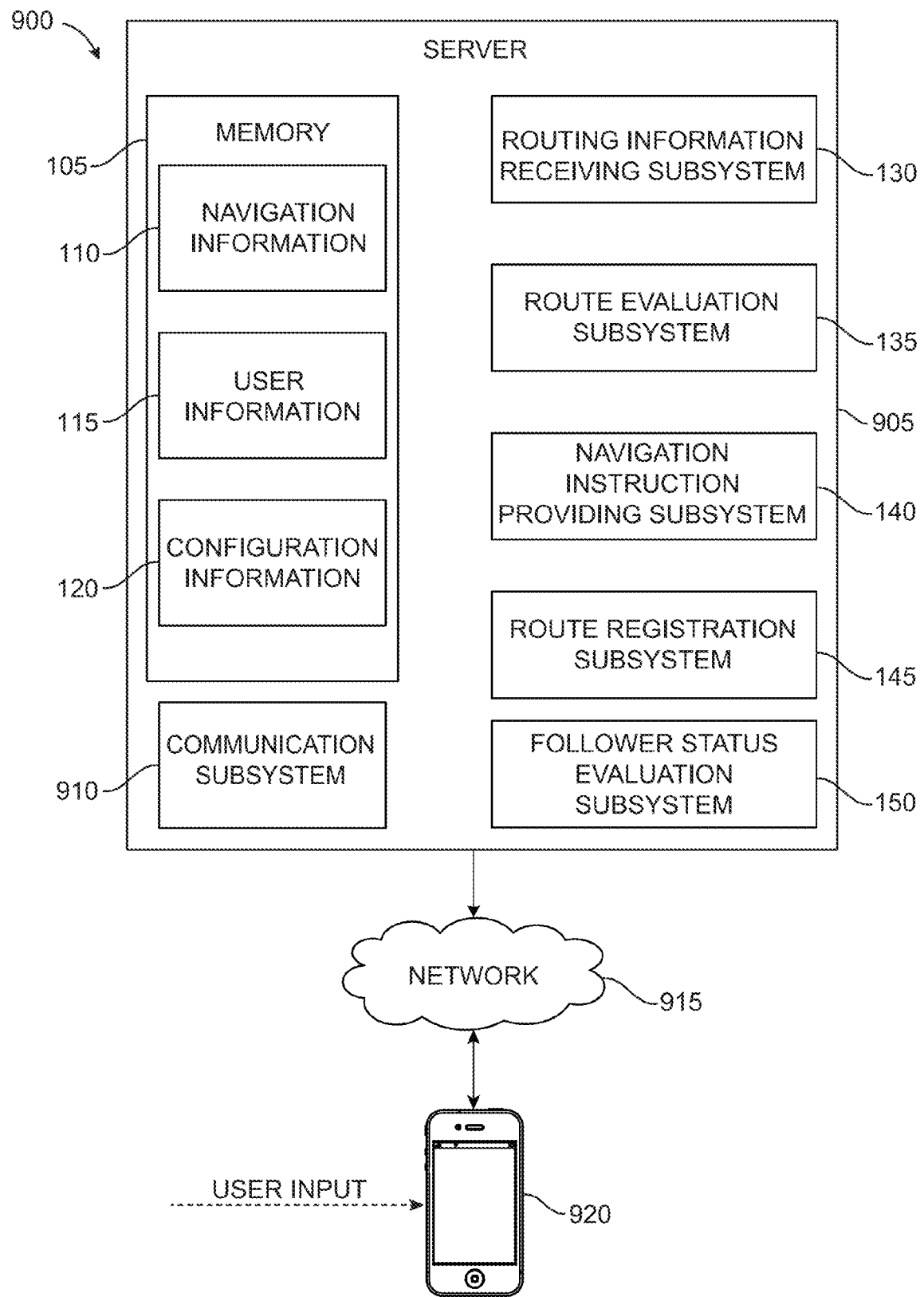
FIG. 9 illustrates a simplified diagram of a distributed system for obtaining updated navigation information according to some embodiments.

FIG. 9 illustrates a simplified diagram of a distributed system 900 for obtaining updated navigation information according to some embodiments. In the embodiment illustrated in FIG. 9, memory 105, routing information receiving subsystem 130, route evaluation subsystem 135, navigation instruction providing subsystem 140, route registration subsystem 145, and follower status evaluation subsystem 150 are provided on a server 905 that includes a communication subsystem 910 and is communicatively coupled, via a network 915, to a remote client device 920. Remote client device 920 may, for instance, include an input/output subsystem, a communication subsystem, and a rendering subsystem, similar to input/output subsystem 125, communication subsystem 155, and rendering subsystem 160.

In some embodiments, network 915 may include one or more communications networks, which can be the Internet, a private network, a public network, a switched network, or any other suitable communication network. Network 915 may include many interconnected systems and communications links, including, but not limited to, hardware links, optical links, satellite or other wireless communications links, wave propagation links, or any other ways for communication of information. Various communication protocols may be used to facilitate communication of information via network 915, including, but not limited to, TCP/IP, HTTP protocols, extensible markup language (XML), wireless application protocol (WAP), protocols under development by industry standard organizations, vendor-specific protocols, customized protocols, and others.

In the configuration illustrated in FIG. 9, one or more user interfaces to a user via remote client device 920, and user input from the user may be received via such user interfaces. In addition, data may be sent from remote client device 920 to server 905, and from server 905 to remote client device 920, to provide the various functionalities and features described above. For example, processing performed by server 905 may enable one or more navigation instructions to be provided on remote client device 920. In addition, processing performed by server 905 may enable a notification and/or prompt related to a change in follower and leader status to be provided on remote client device 920.

In the configuration illustrated in FIG. 9, memory 105, routing information receiving subsystem 130, route evaluation subsystem 135, navigation instruction providing subsystem 140, route registration subsystem 145, and follower status evaluation subsystem 150 are located remotely from remote client device 920, and server 905 may provide the various functionalities and features described above for remote client device 920. In some embodiments, server 920 may provide these functionalities and features for multiple remote client devices. The multiple remote client devices may be served concurrently or in a serialized manner. In some embodiments, the services provided by server 905 may be offered as web-based or cloud services or under a Software as a Service (SaaS) model.

Various different distributed system configurations are possible, which may be different from distributed system 900 depicted in FIG. 9. For example, in some embodiments, memory 105, routing information receiving subsystem 130, route evaluation subsystem 135, navigation instruction providing subsystem 140, route registration subsystem 145, and follower status evaluation subsystem 150 may all be located remotely from each other. The embodiment illustrated in FIG.

9 is thus only one example of a system that may incorporate some embodiments and is not intended to be limiting.

Example Computer System

Figure 10:
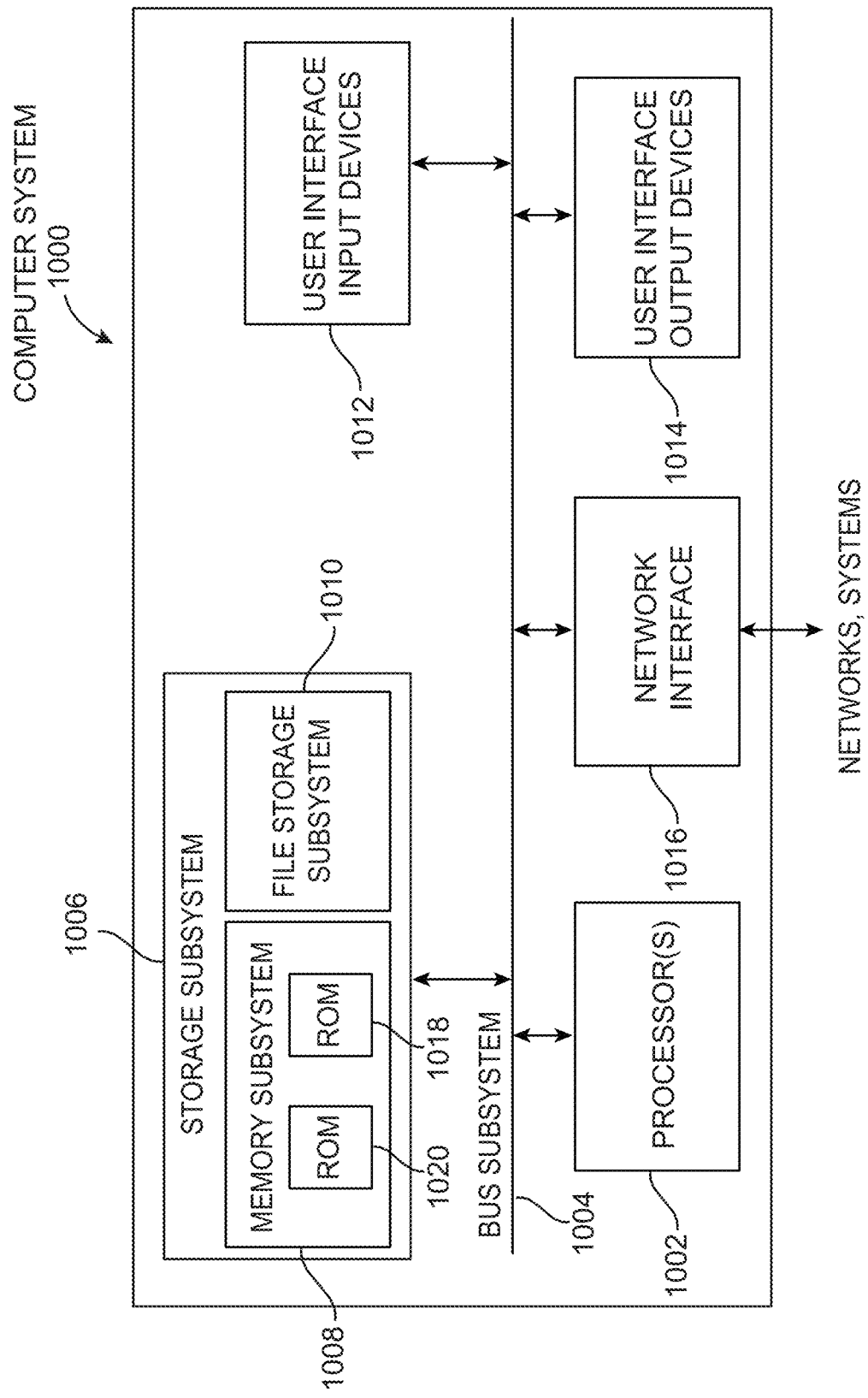
FIG. 10 illustrates a simplified block diagram of a computer system that may incorporate components of a navigation device according to some embodiments.

As noted above, system 100 of FIG. 1 may incorporate one or more embodiments of the invention, may provide one or more of the example user interfaces discussed above, and/or may perform one or more of the methods and/or method steps discussed above. In addition, system 100 may be incorporated into various systems and devices. For instance, FIG. 10 illustrates a simplified block diagram of a computer system 1000 that may incorporate one or more components of navigation system 100 according to some embodiments. As shown in FIG. 10, computer system 1000 may include one or more processors 1002 that communicate with a number of peripheral subsystems via a bus subsystem 1004. These peripheral subsystems may include a storage subsystem 1006, including a memory subsystem 1008 and a file storage subsystem 1010, user interface input devices 1012, user interface output devices 1014, and a network interface subsystem 1016.

Bus subsystem 1004 may provide a mechanism for letting the various components and subsystems of computer system 1000 communicate with each other as intended. Although bus subsystem 1004 is shown schematically as a single bus, alternative embodiments of the bus subsystem may utilize multiple buses.

The one or more processors 1002, which can be implemented as one or more integrated circuits (e.g., as a conventional microprocessor or microcontroller), can control the operation of computer system 1000. In various embodiments, the one or more processors 1002 can execute a variety of programs in response to program code and can maintain multiple concurrently executing programs or processes. At any given time, some or all of the programs to be executed can reside in processor 1002 and/or in storage subsystem 1006. Through suitable programming, processor 1002 can provide various functionalities described above, such as, for instance, registering to follow one or more other devices and/or users, providing navigation instructions, and/or receiving and/or processing routing information.

Network interface subsystem 1016 may provide an interface to other computer systems and networks. Network interface subsystem 1016 may serve as an interface for receiving data from and transmitting data to other systems from computer system 1000. For example, network interface subsystem 1016 may enable computer system 1000 to connect to a client device via the Internet. In some embodiments, network interface 1016 can include radio frequency (RF) transceiver components for accessing wireless voice and/or data networks, for example, using cellular telephone technology and/or advanced data network technology (e.g., 3G, 4G, EDGE, etc.), and/or WiFi (e.g., IEEE 802.11 family standards, other mobile communication technologies, or any combination thereof). Network interface 1016 can further include, in some embodiments, GPS receiver components and/or other components. In some embodiments, network interface 1016 may provide wired network connectivity (e.g., Ethernet) in addition to or instead of a wireless interface.

User interface input devices 1016 may include a keyboard, pointing devices, such as a mouse or trackball, a touchpad, or touch screen incorporated into a display, a scroll wheel, a click wheel, a dial, a button, a switch, a keypad, audio input devices, such as voice recognition devices, microphones, and other types of input devices. In general, use of the term "input device" is intended to include all possible types of devices and mechanisms for inputting information to computer system 1000.

User interface output devices 1014 may include a display subsystem, one or more indicator lights, and/or non-visual displays, such as audio output devices. The display subsystem may be a cathode ray tube (CRT), a flat-panel device such as a liquid crystal display (LCD), a projection device, a touch screen, and the like. In general, the use of the term "output device" is intended to include all possible types of devices and mechanisms for outputting information from computer system 1000.

Storage subsystem 1006 may provide a computer-readable storage medium for storing the basic programming and data constructs that provide the functionality of some embodiments. Storage subsystem 1006 can be implemented, for example, using disk, flash memory, or any other storage media in any combination, and can include volatile and/or non-volatile storage as desired. Software (e.g., programs, code modules, instructions, etc.) that, when executed by a processor, provides the functionalities described herein may be executed by processor(s) 1002. Storage subsystem 1006 may also provide a repository for storing data used in accordance with some embodiments. Storage subsystem 1006 may include memory subsystem 1008 and file/disk storage subsystem 1010.

Memory subsystem 1008 may include a number of memories include a main random access memory (RAM) 1018 for storage of instructions and data during program execution and a read only memory (ROM) 1020 in which fixed instructions may be stored. File storage subsystem 1010 may provide persistent (e.g., non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1000 can be of various types, including a personal computer, a personal device, a workstation, a network computer, a mainframe, a kiosk, a server, a set-top box, or any other data processing system. Due to the ever-changing nature of computers and networks, the description of computer system 1000 depicted in FIG. 10 is intended only as a specific example. Many other configurations having more or fewer components than the system depicted in FIG. 10 are possible.

Various embodiments described herein can be realized using any combination of dedicated components and/or programmable processors and/or other programmable devices. The various embodiments may be implemented only in hardware, only in software, or using combinations thereof. The various processes described herein may be implemented on the same processor or different processors in any combination. Accordingly, where components are described as being configured to perform certain operations, such configuration can be accomplished, for instance, by designing electronic circuits to perform the operation, by programming programmable electronic circuits, such as microprocessors, to perform the operation, or any combination thereof. Processors can communicate using a variety of techniques, including, but not limited to, conventional techniques for inter-processor communication, and different pairs of processors may use different techniques, or the same pair of processors may use different techniques at different times. Further, while the embodiments described herein may make reference to specific hardware and software components, different combinations of hardware and/or software components may also be used, and particular operations described as being implemented in hardware might also be implemented in software, or vice versa.

For example, the processing depicted in FIGS. 6 and 8 and/or otherwise discussed above can be implemented in software (e.g., code, instructions, programs, etc.) executed by one or more processors, other hardware, or combinations thereof. The software may be stored on a non-transitory computer-readable storage medium. The particular series of processing steps depicted in the figures and/or discussed above is not intended to be limiting.

In the description above, for the purposes of explanation, specific details have been set forth in order to provide a thorough understanding of embodiments of the invention. However, it will be apparent that various embodiments may be practiced without these specific details.

The various embodiments discussed herein are not restricted to operation with certain specific data processing environments, but may be free to operate within a number of data processing environments. In addition, while the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method of obtaining updated navigation information, the method comprising:
    receiving, by a first computing device, routing information from a second computing device, the routing information indicative of a first route determined by the second computing device to a stationary destination, wherein the first computing device and the second computing device are to follow the first route to the destination;
    providing navigation instructions at the first computing device based upon the routing information received from the second computing device;
    receiving, by the first computing device, from the second computing device, a change to the routing information indicating an updated route to the destination;
    responsive to receiving the change to the routing information, providing a notification indicating the first route and the updated route;
    sending a request to the second computing device to provide the updated route; and
    providing, by the first computing device, modified navigation instructions corresponding to the updated route responsive to receiving the updated route.

2. The method of claim 1, wherein receiving the change to the routing information includes:
    receiving a current position of the second computing device; and
    determining that the current position of the second computing device is not along the first route associated with the routing information received from the second computing device.

3. The method of claim 1, wherein the first computing device is registered as a follower of the second computing device.

4. The method of claim 1,
    wherein the first route includes at least one step, and
    wherein the routing information includes information describing the at least one step, a current location of the second computing device, and the destination.

5. The method of claim 1, wherein the change to the routing information includes data describing current traffic conditions and a change in one or more segments that make up the first route.

6. A navigation device, comprising:
    a memory; and
    one or more processors coupled to the memory, the one or more processors configured to:
        receive routing information from a computing device, the routing information indicative of a first route determined by the computing device to a stationary destination, wherein the computing device and the navigation device are to follow the first route to the destination;
        provide navigation instructions based upon the routing information received from the computing device;
        receive, from the computing device, a change to the routing information indicating an updated route to the destination;
        responsive to receiving the change to the routing information, provide a notification indicating the first route and the updated route;
        send a request to the computing device to provide the updated route; and
        provide modified navigation instructions corresponding to the updated route responsive to receiving the updated route.

7. The navigation device of claim 6, wherein the notification indicates that the routing information has changed.

8. The navigation device of claim 6, wherein the notification includes a prompt to select whether to follow the first route or the updated route;
    responsive to receiving a selection of the updated route, providing the modified navigation instructions; and
    responsive to receiving a selection on the first route, continuing to provide the navigation instructions.

9. The navigation device of claim 6, wherein the change to the routing information includes data describing current traffic conditions and a change in segments that make up the first route.

10. The navigation device of claim 9, wherein the one or more processors are further configured to:
    determine a detour or waypoint based on the data describing the current traffic conditions.

11. A non-transitory computer-readable storage memory storing instructions for controlling one or more processors to perform operations for obtaining updated navigation information, the operations comprising:
    receiving routing information from a computing device, the routing information indicative of a first route determined by the computing device to a stationary destination, wherein the computing device is to follow the first route to the destination;
    providing navigation instructions based upon the routing information received from the computing device;
    receiving, from the computing device, a change to the routing information indicating an updated route to the destination;
    responsive to receiving the change to the routing information, providing a notification indicating the first route and the updated route;
    sending a request to the computing device to provide the updated route; and
    providing modified navigation instructions corresponding to the updated route responsive to receiving the updated route.

12. The computer-readable storage memory of claim 11, wherein receiving, from the computing device, the change to the routing information includes:
receiving the change to the routing information via at least one server that is configured to coordinate sharing of the routing information.

13. The computer-readable storage memory of claim 11, wherein receiving, from the computing device, the change to the routing information includes:
determining, based on navigation information received via at least one server that is configured to coordinate sharing of the routing information, that a route being taken by the computing device has changed.

14. The computer-readable storage memory of claim 13, wherein determining, based on the navigation information received via the at least one server, that the route being taken by the computing device has changed includes:
requesting updated routing information from the computing device.

15. The computer-readable storage memory of claim 11, wherein the operations further comprise:
displaying a notification that indicates that the routing information has changed and that includes a description of a new route defined by the changed routing information.

16. A method of updating navigation information, the method comprising:
registering, by a first navigation device, to follow a shared route to a stationary destination, wherein a plurality of participants are to follow the shared route to the destination, the plurality of participants including a route leader;
providing, by the first navigation device, one or more navigation instructions associated with the shared route;
receiving, by the first navigation device, position information associated with one or more of the plurality of participants;
determining, by the first navigation device, that the first navigation device has passed the route leader along the shared route based on the position information; and
responsive to the determining, providing a notification including a prompt whether to update leader status information associated with the shared route to designate a participant associated with the first navigation device as the route leader.

17. The method of claim 16, wherein the notification indicates that the first navigation device has passed the route leader, the method further comprising:
responsive to receiving a selection to designate the participant associated with the first navigation device as the route leader, modifying the shared route to update the leader status information associated with the shared route.

18. The method of claim 17, further comprising:
providing a notification to the plurality of participants indicating that the participant associated with the first navigation device is the route leader.

19. The method of claim 18, wherein the leader status information is maintained on at least one server that coordinates sharing of the shared route among the plurality of participants.

20. The method of claim 18, further comprising:
providing, by the first navigation device, one or more modified navigation instructions after updating the leader status information.

21. A navigation device, comprising:
a memory; and
one or more processors coupled to the memory, the one or more processors configured to:
register to follow a shared route to a stationary destination, wherein a plurality of participants are to follow the shared route to the destination, the plurality of participants including a route leader;
provide one or more navigation instructions associated with the shared route;
receive position information associated with one or more of the plurality of participants;
determining, by the navigation device, that the navigation device has passed the route leader along the shared route based on the position information; and
responsive to the determining, providing a notification including a prompt whether to update leader status information associated with the shared route to designate a participant associated with the navigation device as the route leader.

22. The navigation device of claim 21, wherein the notification indicates that the first navigation device has passed the route leader, and wherein the one or more processors are further configured to:
responsive to receiving a selection to designate the participant associated with the first navigation device as the route leader, update leader status information maintained on at least one server that coordinates sharing of the shared route among the plurality of participants.

23. The navigation device of claim 22, wherein updating the leader status information maintained on the at least one server includes providing information identifying the navigation device and network information associated with the navigation device to the at least one server.

24. The navigation device of claim 21, wherein the one or more processors are further configured to:
modify the shared route after updating the leader status information.

25. The navigation device of claim 24, wherein the one or more processors are further configured to:
provide one or more modified navigation instructions based on the modified shared route.

* * * * *